(12) United States Patent
Camenzind

(10) Patent No.: US 12,271,507 B2
(45) Date of Patent: Apr. 8, 2025

(54) METHOD AND ARRANGEMENT FOR EXCHANGING A DOMAIN REGISTRAR FOR AUTHENTICATING AND CONFIGURING DIGITAL CERTIFICATES

(71) Applicant: Siemens Schweiz AG, Zürich (CH)

(72) Inventor: Oskar Camenzind, Steinen (CH)

(73) Assignee: SIEMENS SCHWEIZ AG, Zurich (CH)

( * ) Notice: Subject to any disclaimer, the term of this patent is extended or adjusted under 35 U.S.C. 154(b) by 249 days.

(21) Appl. No.: 17/911,338

(22) PCT Filed: Feb. 16, 2021

(86) PCT No.: PCT/EP2021/053792
§ 371 (c)(1),
(2) Date: Sep. 13, 2022

(87) PCT Pub. No.: WO2021/185520
PCT Pub. Date: Sep. 23, 2021

(65) Prior Publication Data
US 2023/0131803 A1    Apr. 27, 2023

(30) Foreign Application Priority Data
Mar. 17, 2020  (DE) .................. 10 2020 203 364.1

(51) Int. Cl.
*H04L 9/40* (2022.01)
*G06F 21/44* (2013.01)
*G06F 21/64* (2013.01)

(52) U.S. Cl.
CPC .............. *G06F 21/64* (2013.01); *G06F 21/44* (2013.01)

(58) Field of Classification Search
CPC ....... G06F 21/64; G06F 21/44; H04L 63/0823
See application file for complete search history.

(56) References Cited

U.S. PATENT DOCUMENTS 10,615,987 B2 *  4/2020  Levy ................. H04L 63/06
10,715,382 B2 *  7/2020  Guan ................. H04L 41/5058
(Continued)

FOREIGN PATENT DOCUMENTS

WO    WO-2019033116 A1 *  2/2019  ........... G06F 21/604

OTHER PUBLICATIONS

Brski-Keyinfra (Year: 2020).*

*Primary Examiner* — Joseph P Hirl
*Assistant Examiner* — Aayush Aryal
(74) *Attorney, Agent, or Firm* — Slayden Grubert Beard PLLC

(57) ABSTRACT

Methods for exchanging a predecessor domain registrar for the authentication and configuration of digital certificates of IoT devices with a new registrar. The predecessor registrar and the devices are stored using a blockchain. The method may include: determining by the predecessor the number of nearby attestations needed; entering the new registrar into the blockchain; gathering the attestations of the devices using the new registrar; checking whether the new registrar fulfills the defined number; accepting the technical installation with the new registrar as authentication and configuration entity for the devices; sending voucher requests to the new registrar; forwarding the voucher requests to an authorization authority; checking whether the respective device belongs to the new registrar; and if so, issuing a voucher for the corresponding device using the authorization authority and sending the voucher to the corresponding device.

8 Claims, 5 Drawing Sheets

(56) References Cited

U.S. PATENT DOCUMENTS

| | | | |
|---|---|---|---|
| 11,824,643 B2* | 11/2023 | Choyi | H04L 63/0435 |
| 2018/0176112 A1* | 6/2018 | McLaughlin | H04L 9/0861 |
| 2018/0227293 A1* | 8/2018 | Uhr | G06Q 20/40 |
| 2018/0316673 A1* | 11/2018 | Shah | H04W 12/06 |
| 2020/0084202 A1* | 3/2020 | Smith | H04W 12/08 |
| 2020/0120502 A1* | 4/2020 | Lear | H04W 12/084 |
| 2020/0162330 A1* | 5/2020 | Vadapalli | H04L 41/12 |
| 2021/0135872 A1* | 5/2021 | Laffey | H04L 9/0897 |
| 2022/0131856 A1* | 4/2022 | Xia | H04L 63/0428 |

* cited by examiner

METHOD AND ARRANGEMENT FOR EXCHANGING A DOMAIN REGISTRAR FOR AUTHENTICATING AND CONFIGURING DIGITAL CERTIFICATES

CROSS-REFERENCE TO RELATED APPLICATIONS

This application is a U.S. National Stage Application of International Application No. PCT/EP2021/053792 filed Feb. 16, 2021, which designates the United States of America, and claims priority to DE Application No. 10 2020 203 364.1 filed Mar. 17, 2020, the contents of which are hereby incorporated by reference in their entirety.

TECHNICAL FIELD

The present disclosure relates to digital certificates. Various embodiments of the teachings herein include methods and/or arrangements for exchanging a predecessor domain registrar for authenticating and configuring digital certificates of IoT devices by way of a new domain registrar.

BACKGROUND

The Internet of Things (IoT) refers to information and communication technologies for linking physical and/or virtual devices over the Internet or over Internet-like structures. IoT devices for the Internet of Things (IoT) are devices or components of a system that are able to be linked to a network (for example Internet, Intranet) in a wired or wireless manner, and are configured to acquire data, process it, store it or transmit it.

IoT devices are playing an ever more important role in a very wide variety of areas (for example vehicles, factories, offices and residential buildings). The growing number of IoT devices not only points to the relevance of these devices, but also demands a certain degree of security, especially security from manipulation. During the commissioning or installation of IoT devices in networks, said devices must first be checked in order to prevent corrupted devices (for example devices furnished with malicious software) from being installed. This is a manual process and, with the increasing number of IoT devices, can be a time-consuming and expensive process.

SUMMARY

The teachings of the present disclosure describe methods for the commissioning of trusted IoT devices.

BRIEF DESCRIPTION OF THE DRAWINGS

Various embodiments of the teachings herein are described using the figures below by way of example. In the figures.

DETAILED DESCRIPTION

Figure 1:
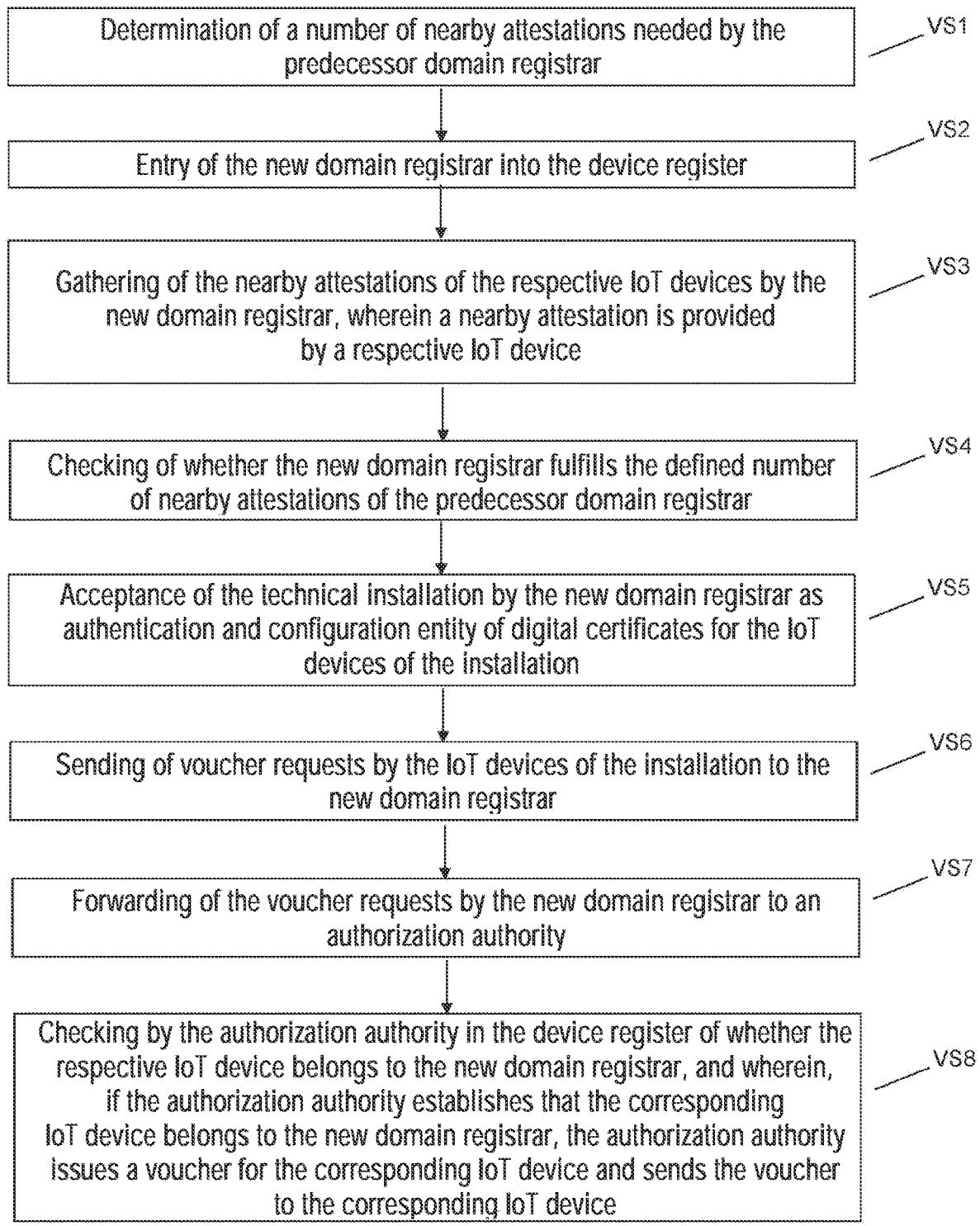
FIG. 1 is a flow diagram showing an example method for exchanging a predecessor domain registrar for the authentication and configuration of digital certificates of IoT devices by way of a new domain registrar.

The teachings of the present disclosure include methods for exchanging a predecessor domain registrar for the authentication and configuration of digital certificates of IoT devices by way of a new domain registrar, wherein the predecessor domain registrar and the IoT devices of a technical installation are stored in a device register on the basis of blockchain technology, the method comprises the following steps:

Determination (i.e. definition or establishment) of the number of nearby attestations needed by the predecessor domain registrar;

Entry of the new domain registrar into the device register;

Gathering of the nearby attestations of the respective IoT devices by the new domain registrar, wherein a nearby attestation is provided by a respective IoT device;

Checking of whether the new domain registrar fulfills the defined (i.e. the needed or established) number of nearby attestations of the predecessor domain registrar;

Acceptance of the technical installation by the new domain registrar as authentication and configuration entity of digital certificates for the IoT devices of the installation;

Sending of voucher requests by the IoT devices of the installation to the new domain registrar;

Forwarding of the voucher requests by the new domain registrar to an authorization authority (MASA, Manufacturer Authorized Signing Authority, manufacturer authorization authority, trusted server);

Checking by the authorization authority (MASA) in the device register (blockchain) of whether the respective IoT device belongs to the (requesting) new domain registrar;

wherein, if the authorization authority (MASA) establishes that the corresponding IoT device belongs to the new domain registrar, the authorization authority (MASA) issues a voucher for the corresponding IoT device and sends the voucher to the corresponding IoT device.

In some embodiments, a IoT device accepts a device identification (for example IDevID, Initial Device Identifier) issued for it from the domain registrar, and the new domain registrar writes the new device identification (for example LDevID, Local Significant Device Identifiers) to the corresponding IoT device (for example in accordance with EST (Enrollment over Secure Transport), for example specified in RFC 7030). Inter alia, this makes possible a secure device identification and a simple provision as well as administration of secure devices.

In some embodiments, checking whether the new domain registrar fulfills the defined nearby attestations of the predecessor domain registrar (in particular whether the defined number (or the number needed) of nearby attestations is fulfilled) taking place by a smart contract of the device register (blockchain). Whether defined conditions have been fulfilled is checked automatically by the smart contract. The smart contract is a computer protocol implemented in blockchain technology, which maps the logic of contractual regulations technically. Datasets (data blocks) are connected to one another by cryptographic methods through blockchain technology.

In some embodiments, the respective signatures of the nearby attestations being compared with the public keys of the respective IoT devices that are still linked in the device register (blockchain) to the predecessor domain registrar. This enhances the data security.

In some embodiments, the method includes checking whether the new domain registrar possesses the secret (private key) that matches the registrar public key that is located in the respective nearby attestations. This also enhances the data security.

In some embodiments, the method includes issuing of a nearby attestation taking place on the basis of a physical presence to the IoT device. The feature for physical presence can be a communication channel at the device for example, or a pushbutton on the device, which must be pushed (advantageously at a specific time).

In some embodiments, the method includes issuing a nearby attestation taking place on the basis of the device belonging to the same computer network (for example a LAN in a building) as the new domain registrar and the IoT device. This also enhances the data security.

In some embodiments, there is an arrangement for carrying out one or more of the methods described herein for exchanging a predecessor domain registrar for the authentication and configuration of digital certificates of IoT devices. Such an arrangement is able to be realized or upgraded with correspondingly configured commercially available components.

In some embodiments, there is a registrar configured for carrying out one or more of the methods described herein for exchanging a predecessor domain registrar for the authentication and configuration of digital certificates of IoT devices. In some embodiments, one of the existing IoT devices is configured to take over and carry out the tasks of the registrar.

In some embodiments, the registrar involves a correspondingly configured IoT device of the installation (for example a building automation system for a building or a factory). When an IoT device that is already present is used as a registrar it is not necessary to provide an additional device.

In some embodiments, the security in a building automation system is a central part of the system. Symmetrical and asymmetrical cryptographic keys are used for the security so that devices (for example field devices, sensors, actuators) of an installation or of a building trust each other and exchange information. So that this trust can be established, a trusted third party is normally used, which can add new devices to an installation, for example on the basis of the execution sequence defined in IETF (Internet Engineering Task Force) BRSKI (Bootstrapping Remote Secure Key Infrastructures).

The trusted third party can be a registrar that represents a CA (Certificate Authority, certification authority) with a public and a private key. The private key of the Certification Authority (CA) is used to sign the LDevID (Locally Significant Device Identifier; IEEE 802.1AE). The registrar is authorized to change security-relevant settings on the devices, such as for example the configuration of a trust relationship to a Certification Authority (CA). The registrar can be part of a commissioning tool for example, which leaves the installation again after the commissioning. As an alternative the registrar can also be on a device (for example correspondingly configured field device) of the installation at which the devices obtain or renew their LDevID X.509 certificate.

The life cycle of a building automation system is normally very long and not infrequently is longer than 15 years. During this time it occurs that devices break down and have to be replaced or the installation is expanded and new devices are added. So that this can take place, the new devices must again obtain their LDevID from a registrar. A usual problem now is that the X.509 certificate of the corresponding private key is lost or forgotten by the registrar. Reasons for this can be that the device with the registrar is defective or the responsible organization or person no longer exists at this point in time (for example after 5 years). That means that no new device can be integrated into the installation, for example when the functionality at the installation is to be expanded or a device is defective and has to be exchanged. When the private key is no longer available from the registrar then a new registrar must be configured and all devices must be in the delivery state before they accept the new registrar again. That means that subsequently the entire application (for example lighting system or HVAC system) has to be commissioned and tested again. This is expensive and complex.

FIG. 1 is a flow diagram showing a method for exchanging a predecessor domain registrar for the authentication and configuration of digital certificates of IoT devices by way of a new domain registrar, wherein the predecessor domain registrar and the IoT devices of a technical installation are stored in a device register based on blockchain technology. The method shown comprises: (VS1) Determination of the number of nearby attestations needed by the predecessor domain registrar; (VS2) Entry of the new domain registrar into the device register; (VS3) Gathering of the nearby attestations of the respective IoT devices by the new domain registrar, wherein a nearby attestation is provided by a respective IoT device; (VS4) Checking of whether the new domain registrar fulfills the defined number of nearby attestations of the predecessor domain registrar (i.e. the necessary number of nearby attestations of predecessor domain registrar determined); (VS5) Acceptance of the technical installation by the new domain registrar as authentication and configuration entity of digital certificates for the IoT devices of the installation; (VS6) Sending of voucher requests by the IoT devices of the installation to the new domain registrar; (VS7) Forwarding of the voucher requests by the new domain registrar to an authorization authority; and (VS8) Checking by the authorization authority in the device register whether the respective IoT device belongs to the (requesting) new domain registrar. If the authorization authority establishes that the corresponding IoT device belongs to the new domain registrar, the authorization authority issues a voucher for the corresponding IoT device and sends the voucher to the corresponding IoT device. The method can be realized with commercially available software and hardware components as a computer-implemented method, with correspondingly configured data processing facilities (computer, server, etc.) and corresponding communication mechanisms (Internet, Intranet, radio links, etc.).

In some embodiments, the corresponding IoT device accepts a device identification issued for it by the new domain registrar, and advantageously the new domain registrar writes the new device identification to the corresponding IoT device.

In some embodiments, the checking of whether the new domain registrar fulfills the defined nearby attestations of the predecessor domain registrar takes place by a smart contract of the device register.

In some embodiments, the respective signatures of the nearby attestations are compared with the public keys of the respective IoT devices that are still linked to the predecessor domain registrar in the device register.

In some embodiments, it is furthermore checked whether the new domain registrar possesses the secret (for example credential) that matches the registrar public key, which is located in the respective nearby attestations.

In some embodiments, the issuing of a nearby attestation takes place on the basis of a physical presence for the IoT device. The feature for physical presence can be a communication channel at the device. A possible communication channel is radio, of which the range is restricted, such as for example WPAN (Bluetooth, Wi-Fi, 802.15.4 etc.) or NFC. In some embodiments, it can be a local IP address space, such as for example an IPv6 link-local or an IPv6 realm-local address. As a further feature for physical presence a key can be used, which must be pressed at a particular time.

A nearby attestation has the following data content for example:

```
{   Unique device identification (for example serial number)
    public key of the device
    Physical presence type (for example BLE or sender IP address
    Public key information from the registrar
} Signature of the nearby attestation with the secret that matches
    the public key of the device from the data content.
```

In some embodiments, issuing a nearby attestation takes place on the basis of the new domain registrar and the IoT device belonging to the same computer network. When commissioned the devices and the associated registrar are written into a private or publicly accessible and subsequently non-modifiable database (just referred to below as the database). A possible database technology could be the Distributed Ledger Technology (DLT), which is often also called the blockchain. The devices or their public key are assigned to the registrar or to its public key and this information is likewise written into the database. The entries in the database are made by an installation-specific registrar. In addition the registrar can write an installation-specific recovery procedure into the database for the case in which the registrar is no longer available (for example password or secret lost). This takes place in the form of a smart contract or also called chaincode. When the registrar (registration authority) is now no longer available a new registrar can take over the devices (IoT devices) from the predecessor registrar in accordance with the defined recovery procedure in the smart contract.

In some embodiments, the recovery procedure is characterized in that the new registrar presents a defined number of nearby attestations of devices that are assigned to the predecessor registrar in the database. The nearby attestations are signed by the device with the private key for which the public key is linked in the database to the predecessor registrar. The nearby attestations are only issued by the respective device when the new registrar can prove that it is physically in the vicinity of the respective device. The feature for physical presence can be defined for a specific installation and was written by the predecessor registrar together with the recovery procedure into the database.

The feature for physical presence can be a communication channel at the device. One possible communication channel is radio, the range of which is restricted, such as for example WPAN (Bluetooth, Wi-Fi, 802.15.4 etc.) or NFC. As an alternative it can also be a local IP address space, such as for example a first IPv6 link-local or an IPv6 realm-local address. As a further feature for physical presence a push-button can be used, which has to be pushed at a specific point in time. As soon as the defined features for the physical presence are fulfilled, the device issues a nearby attestation for the new registrar.

After the new registrar has received or gathered the predefined number of nearby attestations, it can transfer these to the database. The database now checks by means of the recovery procedure in the smart contract whether the new registrar is authorized to take over the devices from the predecessor registrar. In this case the smart contract checks whether all nearby attestations or the devices belong to the corresponding predecessor registrar and whether the number of nearby attestations is equal to or greater than the predefined number in the smart contract. For this the signature of the nearby attestations is checked with the corresponding public key of the device, which is stored in the database and at this point in time is still linked to the predecessor registrar. In addition a check is made as to whether the new registrar possesses the secret (credential, authorization) that matches the registrar public key, which is stored in the corresponding nearby attestation. If all checks were successful all devices are transferred from the predecessor registrar to the new registrar. This means that, as from this point in time, all devices are now only assigned in the database to the new registrar.

As soon as the devices in the database are assigned to the new registrar, the normal process can be started in order to distribute the LDevID (X.509 certificate) to the devices. This means that the registrar first of all obtains from the device a voucher request (for example RFC8366), which the registrar sends to a trusted server (MASA, Manufacturer Authorized Signing Authority) for the device. This server checks the database for whether the device really belongs to the registrar that has sent the voucher request. If this check is positive, then the server issues a voucher. The voucher confirms to the device (IoT device) that it can trust the new registrar. The registrar subsequently forwards the voucher to the device. As from now the device trusts the registrar that is stored in the voucher, if all other checks were positive. In the next step the device accepts an LDevID issued for it by the corresponding registrar and the registrar can write the LDevID to the device, for example in accordance with EST (RFC7030; Enrollment over Secure Transport).

The gathering of the nearby attestation by the registrar can be initiated by the registrar, for example through a broadcast message to the devices in the network, which in response send the corresponding nearby attestations to the registrar (or the new registrar). However it can also be that the devices in the network recognize a new registrar independently (for example by radio location, similarly to the way that a present device is notified in a WLAN network or with Bluetooth) and send their nearby attestations automatically to the registrar.

Figure 2:
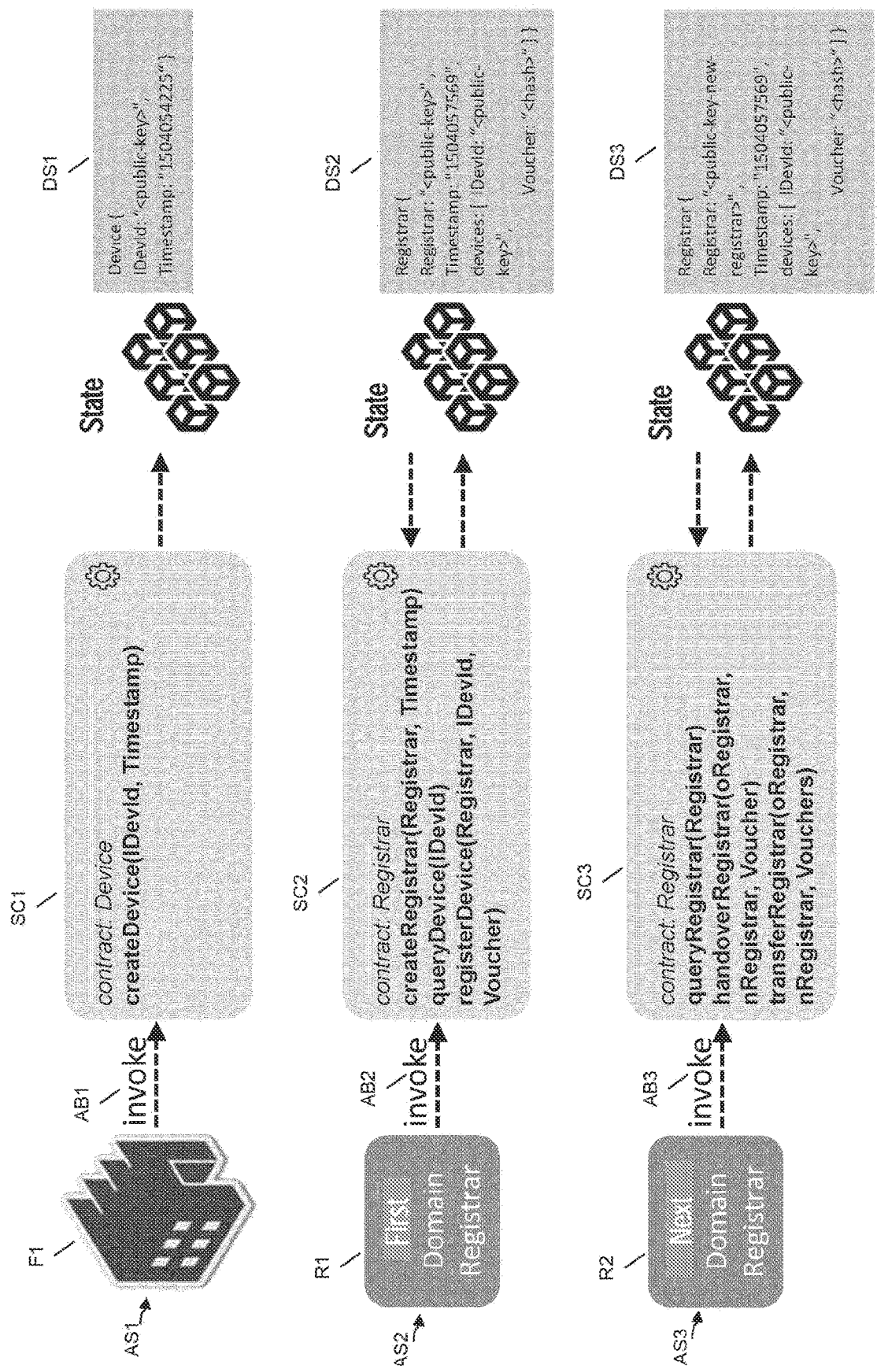
FIG. 2 is a diagram showing examples of smart contracts.

FIG. 2 shows a first diagram for examples of smart contracts SC1-SC3. Smart contracts SC1-SC3 map a logic and transactions of contractual agreements technically to a protocol able to be executed on a computer or computer network. For example the blockchain technology supports Ethereum smart contracts. In the example diagram in accordance with FIG. 2 the upper section AS1 shows a factory F1, wherein the smart contract SC1 for a device (contract: Device) is activated (invoked) by the activation command AB1.

The smart contract SC1 is shown in dummy code:

```
contract: Device
createDevice(IDevId, Timestamp)
```

Shown at the upper right edge of FIG. 2 is the data structure DS1 of the device after execution of the smart contract SC1 (likewise in a dummy code notation):

```
Device {
    IDevId: "<public-key>",
    Timestamp: "1504054225" }
```

In the example diagram in accordance with FIG. 2 the middle section AS2 shows a first domain registrar R1, wherein the smart contract SC1 for the registrar R1 (contract: registrar) is activated (invoked) by the activation command AB2.

The smart contract SC2 is shown in dummy code:

```
contract: registrar
createRegistrar(registrar, Timestamp)
queryDevice (IDevId)
registerDevice(registrar, IDevId, voucher)
```

Shown on the right-hand edge (in the middle) of FIG. 2 is the data structure DS2 of registrar R1 after execution of the smart contract SC2 (likewise in a dummy code notation):

```
registrar {
    registrar: "<public-key>",
    Timestamp: "1504057569",
    devices: [    IDevId: "<public-key>",
                  voucher: "<hash>" ] }.
```

In the example diagram in accordance with FIG. 2 the lower section AS3 shows a next domain registrar R2, wherein the smart contract SC3 for the registrar R2 (contract: registrar) is activated (invoked) by the activation command AB3.

The smart contract SC3 is shown in dummy code:

```
contract: registrar
queryRegistrar(registrar)
handoverRegistrar(oRegistrar, nRegistrar, voucher)
transferRegistrar(oRegistrar, nRegistrar, vouchers).
```

Shown on the right-hand edge (at the bottom) of FIG. 2 is the data structure DS3 of registrar R2 after execution of the smart contract SC3 (likewise in a dummy code notation):

```
registrar {
    registrar: "<public-key-new-registrar>" ,
    Timestamp: "1504057569",
    devices: [    IDevId: "<public-key>",
                  voucher: "<hash>" ] }.
```

Figure 3:
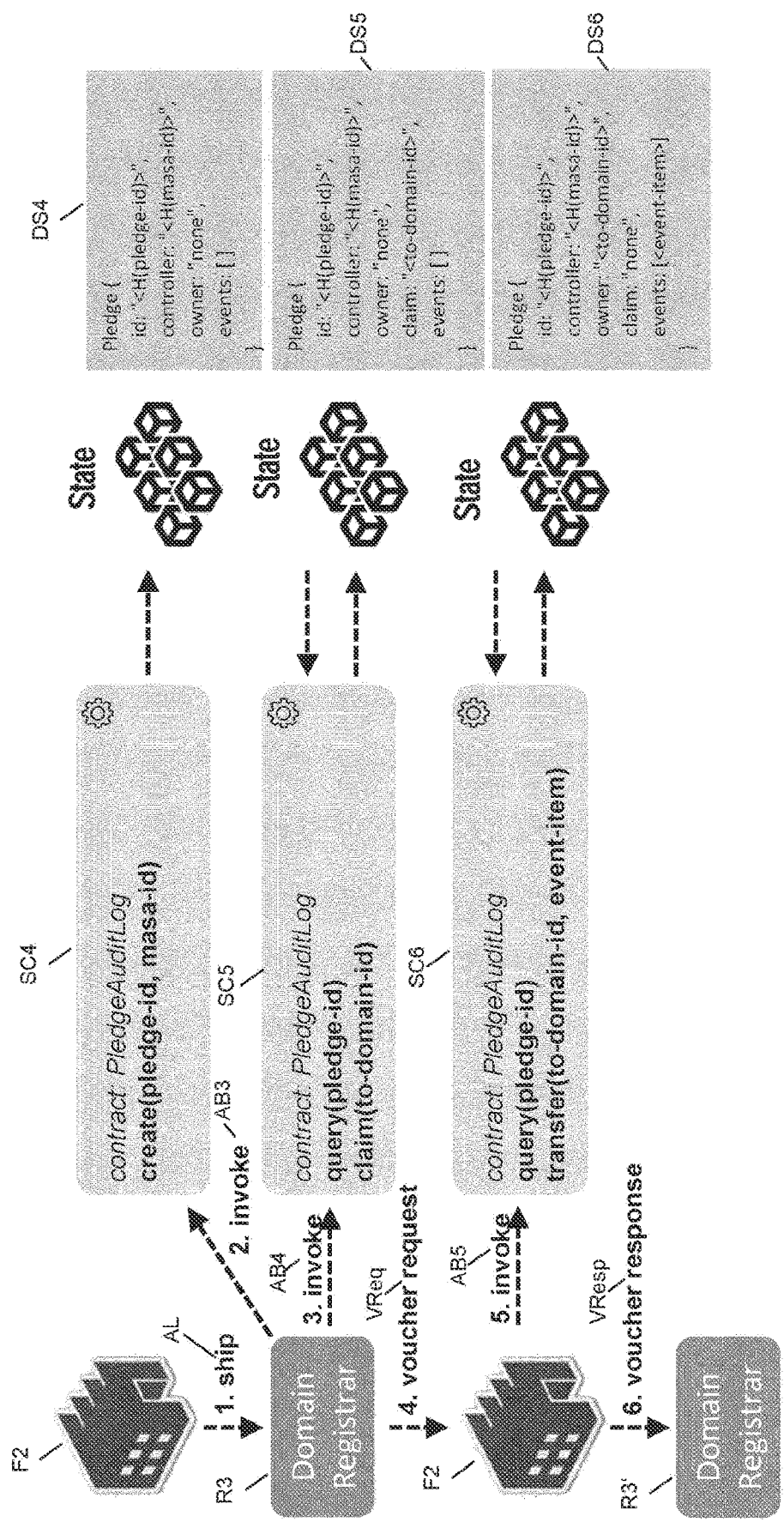
FIG. 3 is a diagram showing examples of smart contracts.

FIG. 3 shows a second diagram for examples of smart contracts SC4-SC6. The smart contracts SC4-SC6 are likewise shown in dummy code.

The smart contract SC4 in dummy code:

```
contract: PledgeAuditLog
create(pledge-id, masa-id).
```

The smart contract SC5 in dummy code:

```
contract: PledgeAuditLog
query(pledge-id)
claim(to-domain-id).
```

The smart contract SC6 in dummy code:

```
contract: PledgeAuditLog
query(pledge-id)
transfer(to-domain-id, event-item).
```

The right-hand edge of the example diagram in accordance with FIG. 3 shows the respective data structures DS4 to DS6 for a device (also called a pledge) after execution of the respective smart contracts SC4-SC6.

Data structure DS4 of device (pledge) shown after execution of the smart contract SC4 (likewise in a dummy code notation):

```
Pledge {
    id: "<H(pledge-id)>",
    controller: "<H(masa-id)>",
    owner: "none",
    events: [ ]
}.
```

Data structure DS5 of device (pledge) shown after execution of the smart contract SC5 (likewise in a dummy code notation):

```
Pledge {
    id: "<H(pledge-id)>",
    controller: "<H(masa-id)>",
    owner: "none",
    claim: "<to-domain-id>",
    events: [ ]
}.
```

Data structure DS6 of device (pledge) shown after execution of the smart contract SC6 (likewise in a dummy code notation):

```
Pledge {
    id: "<H(pledge-id)>",
    controller: "<H(masa-id)>",
    owner: "<to-domain-id>",
    claim: "none",
    events: [<event-item>]
}.
```

The left-hand edge of the example diagram in accordance with FIG. 3 shows an example of an execution sequence scenario for the registration (enrollment) of a factory-new device as registrar. The delivery AL (step: 1. ship) of the registrar R3 takes place by way of the manufacturer F2 (factory). The registrar R3 issues an activation command AB3 (step: 2. invoke) to the smart contract SC4. Furthermore the registrar R3 issues an activation command AB4 (step: 3. invoke) to the smart contract SC5. As next step VReq (step: 4. voucher request) the registrar R3 requests from the manufacturer F2 a voucher. The manufacturer F2 issues an activation command AB5 (step: 5. invoke) to the smart contract SC6. In the next step VResp (step: 6. voucher response) the manufacturer F2 delivers the voucher (certificate) to the registrar R3'.

After receipt of the activation requests AB3-AB5 the corresponding smart contracts SC4-SC6 are executed in a computer-implemented manner and mapped accordingly in the ledger implemented in blockchain technology.

Figure 4:
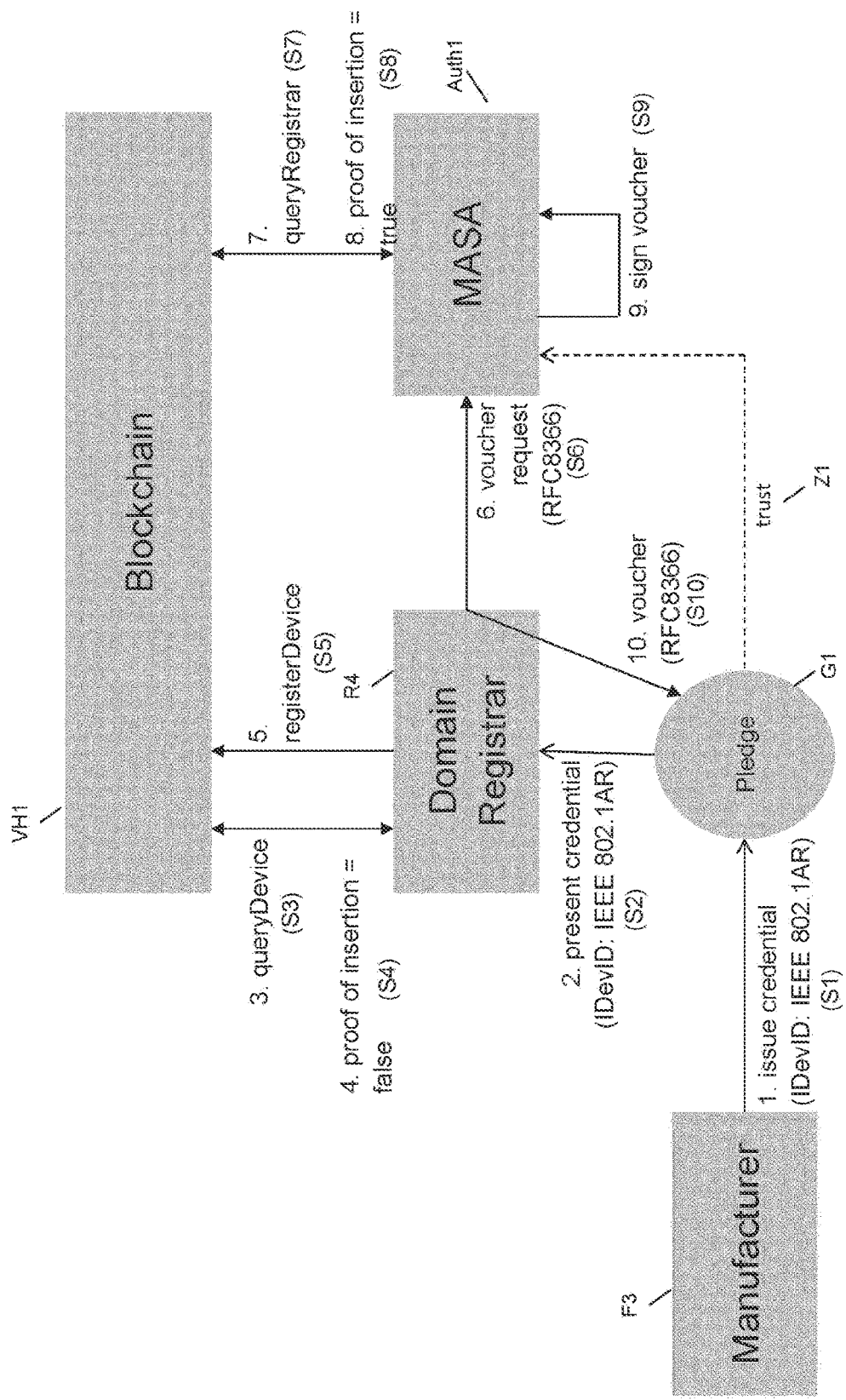
FIG. 4 is a drawing showing an example of an arrangement and a scenario for the registration of factory-new IoT devices.

FIG. 4 shows an example of an arrangement and a scenario for the registration of factory-new IoT devices (Factory-New Device Enrollment). The example arrangement in accordance with FIG. 4 shows a manufacturer (Manufacturer) F3 for IoT devices G1 (pledge). An IoT device G1 can for example involve Internet-capable field devices such as sensors (for example temperature sensors, fire alarms) or actuators (for example actuating elements). A domain registrar R4 is responsible and competent for the acceptance of an IoT device G1 into a network (for example LAN or IP network of a building).

In some embodiments, domain registrar R4 can involve an independent device. The function of the domain registrar R4 can however also be taken over by an IoT device G1 of the network. For this the device G1 is configured with corresponding software and hardware. The example arrangement in accordance with FIG. 4 furthermore has a distributed ledger (blockchain) VH1, as well as an authorization authority Auth1 (MASA, Manufacturer Authorized Signing Authority). The authorization authority Auth1 can for example involve a trusted server (for example a certification server). The distributed ledger (blockchain) VH1 is configured for carrying out transactions on the basis of blockchain technology. A blockchain in technological terms represents a distributed database. The registration of the device G1 in the network is based on blockchain technology.

Description of Execution Sequence (Scenario with Steps S1 to S9) for the Registration of Factory-New IoT Devices:

| | |
|---|---|
| S1 | The manufacturer F3 equips a factory-new device G1 (pledge) with a "credential". [1. issue credential (IDevID: IEEE 802.1AR)] |
| S2 | The device G1 presents the credential) to the domain registrar R4. [2. present credential (IdevID: IEEE 802.1AR)] |
| S3 | The registrar R4 checks whether the device G1 is present in the distributed database of ledger VH1, by a corresponding query. [3. queryDevice] |
| S4 | Notification to the ledger VH1 at the registrar R4 when the device G1 does not have a corresponding entry in the database (blockchain) of the ledger. [4. proof of insertion = false] |
| S5 | Registration of the device G1 in the database (blockchain) by the registrar R4 when the device G1 has a corresponding entry in the database of the ledger VH1. [5. registerDevice] |
| S6 | Request for a voucher (Reference, certificate) for the device G1 by the registrar R4 to the authorization authority Auth1 (MASA, Manufacturer Authorized Signing Authority). [6. voucher request (RFC8366)] |
| S7 | The authorization authority Auth1 (MASA) checks whether the registrar R4 is present in the distributed database of the ledger VH1, by way of a corresponding query. [7. queryRegistrar] |
| S8 | The distributed ledger VH1 notifies the authorization authority Auth1 (MASA) whether the registrar R4 is present in the distributed database of the ledger VH1. [8. proof of insertion = true] |
| S9 | When the registrar R4 is present in the distributed database of the ledger VH1 (8. proof of insertion = true), the authorization authority Auth1 (MASA) issues a voucher for the device G1. [9. sign voucher] |
| S10 | The authorization authority Auth1 (MASA) sends via the registrar R4 the voucher for the device G1 to the device G1. [10. voucher (RFC8366)] |

In the diagram in accordance with FIG. 4 the solid arrows represent queries or data flows between the corresponding components. The dashed arrow between the device G1 (pledge) and the authorization authority Auth1 (MASA) represents a trusted relationship (trust or trusted certificate) Z1 between the device G1 and the authorization authority Auth1.

A pledge is an IoT device that would like to enter into a domain and only trusts one specific MASA. A voucher (RFC 8366) is an artifact that is signed by a pledge or its manufacturer and is needed to assign the pledge to a new "owner". It contains specific information such as pledge certificate, domain-id and serial number of the device.

A domain registrar represents a network and holds the following tasks as admin:
authenticate pledge
distribute vouchers The MASA (authorization authority) is responsible for the verification of arriving vouchers, as well as the signing and returning of vouchers for a pledge. The audit Log is a data structure that contains the device histories (also called "events").

Figure 5:
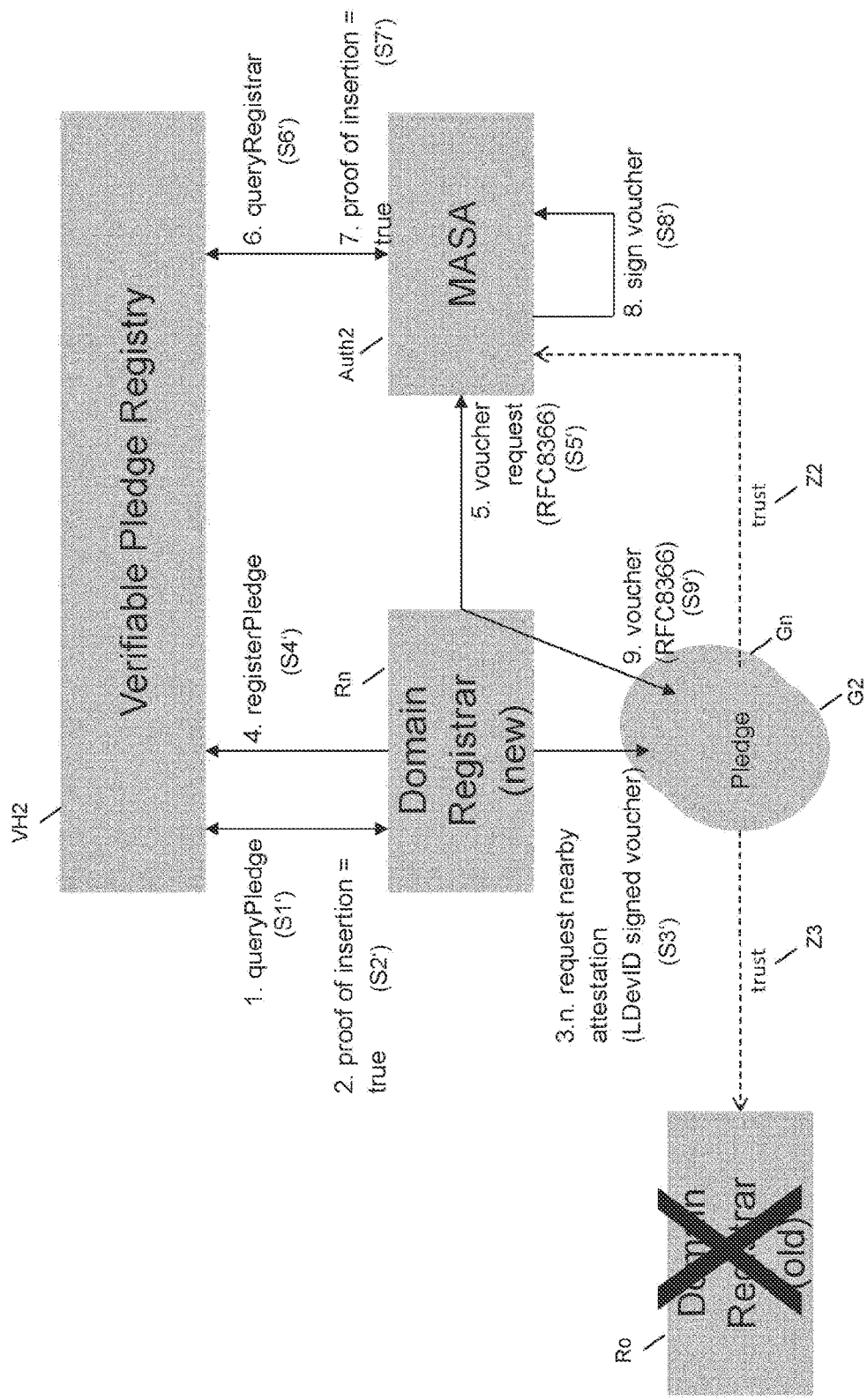
FIG. 5 is a drawing showing an example of an arrangement and a scenario for a registrar exchange.

FIG. 5 shows an example of an arrangement and a scenario for a registrar exchange (recovery procedure). If a registrar is no longer available (for example password or secret lost) then a new registrar can take over the devices from the predecessor registrar, in accordance with a defined recovery procedure defined as a smart contract or in chain code.

The recovery procedure is characterized in that the new registrar presents a defined number of nearby attestations of devices, which are assigned to the predecessor registrar in the database VH2 (blockchain). A nearby attestation is signed by the device with the private key, of which the public key is linked in the database VH2 (blockchain) to the predecessor registrar. A nearby attestation is only issued by the device when the new registrar can prove that it is physically in the vicinity. The feature for physical presence can be defined on an installation-specific basis and was written by the predecessor registrar together with the recovery procedure into the database VH2 (distributed ledger in blockchain technology).

The example arrangement in accordance with FIG. 5 shows an old domain registrar Ro to be replaced, the new domain registrar Rn, which is to replace the old domain registrar Ro. Furthermore FIG. 5 shows the IoT devices (pledge) G2-Gn of a network (for example IP network) for which a registrar is responsible. An IoT device G2-Gn can for example involve Internet-capable field devices such as sensors (for example temperature sensors, fire alarms) or actuators (for example actuation elements). A domain registrar Ro, Rn is responsible and competent for the acceptance of an IoT device G2-Gn into a network (for example LAN- or IP network of a building).

Furthermore the example arrangement in accordance with FIG. 5 has a distributed ledger (blockchain) VH2, as well as an authorization authority Auth2 (MASA, Manufacturer Authorized Signing Authority). The authorization authority Auth2 can for example involve a trusted server (for example a certification server). The distributed ledger (blockchain)

VH2 is configured for carrying out of transactions on the basis of blockchain technology.

A blockchain in technological terms represents a distributed database. The registration of the devices G2 to Gn in the network is based on blockchain technology.

Description of Execution Sequence (Scenario with Steps S1' to S9') for a Registrar Exchange:

| | |
|---|---|
| S1' | The new registrar Rn inserts itself into the database VH2 . [1. queryPledge] |
| S2' | The new registrar Rn checks whether it really exists in the database (distributed ledger) VH2. [2. proof of insertion = true] |
| S3' | The new registrar Rn gathers the nearby attestations. [3.n. request nearby attestation (LDevID signed voucher)] |
| S4' | The new registrar Rn takes over the installation. [4. registerPledge] |
| S5' | The new registrar Rn receives the voucher request from device G2-Gn and sends this to the authorization authority Auth2 (MASA). [5. voucher request (RFC8366)] |
| S6' | The authorization authority Auth2 (MASA) checks in the database (distributed ledger) VH2, whether the device G2-Gn belongs to the querying registrar Rn. [6. queryRegistrar] |
| S7' | The database VH2 answers accordingly. [7. proof of insertion = true] |
| S8' | The authorization authority Auth2 (MASA) issues a voucher for the corresponding device G2-Gn. [8. sign voucher] |
| S9' | The voucher is sent back to the device G2-Gn. [9. voucher (RFC8366)] |

In the diagram in accordance with FIG. 5 the solid arrows represent queries or data flows between the corresponding components. The dashed arrows represent trusted relationships (trust or trusted certificate) Z2, Z3. In some embodiments, when the private key of the registrar is no longer available all devices can be transferred automatically by means of nearby attestations to a new registrar, without going into the delivery state.

Depending on technology, the database no longer absolutely has to be operated by the manufacturer. This means that the costs and the responsibility or the risk are also no longer with the manufacturer. To answer a voucher request the manufacturer still has to provide infrastructure however. This however only involves a check of the database before the voucher is issued for a specific device. In security terms this function, viewed in overall terms, is far less critical than the database for example.

Despite this a manufacturer can decide to be part of a distributed database and to operate a node of their own. It can be in a consortium or also just company-internal. This means that the manufacturer in any event has an up-to-date image of the database. The advantage of a secure and subsequently non-modifiable database remains.

In some embodiments, the methods include efficient secure acceptance and checking (is a malicious or corrupted IoT device involved?) of IoT devices in networks (for example a network for a building with field devices connected in the network. This process is automated on the basis of BRSKI (Bootstrapping Remote Secure Key Infrastructure, IETF Standard). A trusted authorization authority (MASA, Manufacturer Authorized Signing Authority) in this case makes available the history of a specific IoT device to a domain registrar (for example network admin), whereby the latter can check a device. The Ethereum blockchain technology can be used as a distributed database for example.

The present disclosure describes methods and/or arrangements for exchange of a predecessor domain registrar for the authentication and configuration of digital certificates of IoT devices by way of a new domain registrar, wherein the predecessor domain registrar and the IoT devices of a technical installation are stored in a device register on the basis of blockchain technology, wherein the configuration (or the establishing or determination or definition) of the number of nearby attestations needed by the predecessor domain registrar takes place; wherein the new domain registrar is entered into the device register; wherein a gathering of the nearby attestations of the respective IoT devices by the new domain registrar takes place, in this case a nearby attestation is provided by a respective IoT device; wherein a check is carried out as to whether the new domain registrar fulfills the defined number of nearby attestations of the predecessor domain registrar; wherein the new domain registrar is used as authentication and configuration entity of digital certificates for the IoT devices of the installation; wherein voucher requests are sent by the IoT devices of the installation to the new domain registrar; wherein a forwarding of the voucher requests by the new domain registrar to an authorization authority (MASA, Manufacturer Authorized Signing Authority, trusted server) takes place; wherein a check is made by the authorization authority (MASA) in the device register (blockchain) as to whether the respective IoT device belongs to the (requesting) new domain registrar; wherein, if the authorization authority (MASA) establishes that the corresponding IoT device belongs to the new domain registrar, the authorization authority (MASA) issues a voucher for the corresponding IoT device and sends the voucher to the corresponding IoT device.

REFERENCE CHARACTERS

VS1-VS8 Method step
F1-F3 Factory
R1-R3, R3', R4, Rn, Ro Registrar
AB1-AB5 Activation command
SC1-SC6 Smart contract
DS1-DS3 Data structure
AS1-AS3 Section
AL Delivery
VReq Voucher request
VResp Voucher delivery
S1-S10, S1'-S9' Step
G1, G2, Gn Device
VH1, VH2 Distributed ledger
Auth1, Auth2 Authorization authority
Z1-Z3 Certificate

What is claimed is:

1. A method for exchanging a predecessor domain registrar for the authentication and configuration of digital certificates of Internet of Things (IoT) devices with a new domain registrar, wherein the predecessor domain registrar and the IoT devices of a technical installation are stored in a device register using blockchain technology, the method comprising:

determining by the predecessor domain registrar a number of nearby attestations needed, wherein the number is greater than one;

entering the new domain registrar into the device register;

gathering a set of nearby attestations of the respective IoT devices using the new domain registrar, wherein a respective nearby attestation is provided by a respective IoT device;

checking whether the new domain registrar fulfills the number of nearby attestations needed;

accepting the technical installation with the new domain registrar as authentication and configuration entity of digital certificates for the IoT devices of the technical installation;

sending voucher requests using the IoT devices to the new domain registrar;

forwarding the voucher requests from the new domain registrar to an authorization authority;

checking the authorization authority in the device register of whether the respective IoT device belongs to the new domain registrar; and if the authorization authority establishes that the respective IoT device belongs to the new domain registrar, issuing a voucher for the respective IoT device using the authorization authority and sending the voucher to the respective IoT device.

2. The method as claimed in claim 1, further comprising:
accepting a device identification issued for the respective IoT device from the predecessor domain registrar; and
writing the device identification to the respective IoT device using the new domain registrar.

3. The method as claimed in claim 1, wherein checking whether the new domain registrar fulfills the number of nearby attestations of the predecessor domain registrar includes using a smart contract of the device register.

4. The method as claimed in claim 3, further comprising comparing respective signatures of the respective nearby attestations with public keys of any IoT devices still linked to the predecessor domain registrar in the device register.

5. The method as claimed in claim 3, further comprising checking whether the new domain registrar possesses a secret matching a registrar public key held in the nearby attestations.

6. The method as claimed in claim 1, wherein issuing a nearby attestation depends on a physical presence for the IoT devices.

7. The method as claimed in claim 1, wherein issuing a nearby attestation depends on belonging to a computer network shared by the new domain registrar and the IoT device.

8. A system comprising:
a memory storing a set of instructions;
a processor in communication with the memory;
wherein the set of instructions, when accessed and executed by the processor, cause the processor to execute a method for exchanging a predecessor domain registrar for the authentication and configuration of digital certificates of IoT devices with a new domain registrar, wherein the predecessor domain registrar and the IoT devices of a technical installation are stored in a device register on the basis of blockchain technology, the method comprising:

determining by the predecessor domain registrar a number of nearby attestations needed, wherein the number is greater than one;

entering the new domain registrar into the device register;

gathering a set of nearby attestations of the IoT devices using the new domain registrar, wherein a respective nearby attestation is provided by a respective IoT device;

checking whether the new domain registrar fulfills the needed number of nearby attestations;

accepting the technical installation with the new domain registrar as authentication and configuration entity of digital certificates for the IoT devices of the technical installation;

sending voucher requests using the IoT devices to the new domain registrar;

forwarding the voucher requests from the new domain registrar to an authorization authority;

checking the authorization authority in the device register of whether the respective IoT device belongs to the new domain registrar; and if the authorization authority establishes that a respective IoT device belongs to the new domain registrar, issuing a voucher for the respective IoT device using the authorization authority and sending the voucher to the corresponding IoT device.

* * * * *